(12) United States Patent
Wilson et al.

(10) Patent No.: US 7,869,490 B1
(45) Date of Patent: Jan. 11, 2011

(54) REPEATER FOR REGENERATING SPECTRALLY COMPATIBLE SIGNALS ALONG A TELECOMMUNICATION LINE

(75) Inventors: Arlynn Wilson, Huntsville, AL (US); Kevin Schneider, Huntsville, AL (US); Marc Kimpe, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 1262 days.

(21) Appl. No.: 10/929,814

(22) Filed: Aug. 30, 2004

(51) Int. Cl.
*H04L 25/20* (2006.01)

(52) U.S. Cl. .................. 375/211; 375/242; 375/222; 375/252; 375/223

(58) Field of Classification Search ................ 375/211, 375/242, 222, 223, 252
See application file for complete search history.

(56) References Cited

U.S. PATENT DOCUMENTS

| | | | |
|---|---|---|---|
| 5,809,033 A | 9/1998 | Turner et al. | |
| 6,115,415 A | 9/2000 | Goldstein et al. | |
| 6,370,185 B1 * | 4/2002 | Schmutz et al. | 375/214 |
| 6,553,063 B1 * | 4/2003 | Lin et al. | 375/223 |
| 6,625,116 B1 * | 9/2003 | Schneider et al. | 370/226 |
| 6,687,306 B1 | 2/2004 | Wang et al. | |
| 6,721,279 B1 | 4/2004 | Zhang et al. | |
| 6,721,363 B1 | 4/2004 | Qiu et al. | |
| 6,782,037 B1 | 8/2004 | Krishnamoorthy et al. | |
| 7,203,241 B1 * | 4/2007 | Zhang et al. | 375/242 |
| 2004/0213170 A1 * | 10/2004 | Bremer | 370/282 |
| 2005/0220178 A1 * | 10/2005 | Ginis | 375/219 |
| 2007/0077953 A1 * | 4/2007 | Wang | 455/517 |

* cited by examiner

*Primary Examiner*—Shuwang Liu
*Assistant Examiner*—Kabir A Timory
(74) *Attorney, Agent, or Firm*—Lanier Ford Shaver & Payne, P.C.; Jon E. Holland

(57) ABSTRACT

A repeater for regenerating signals communicated along a telecommunication line uses a constellation providing a sufficiently high constellation density to ensure that regenerated signals are spectrally compatible. In one exemplary embodiment, such a repeater is configured to implement a method comprising the steps of: receiving first data signals from a first telecommunication line segment; demodulating the first data signals thereby recovering digital data using a constellation that provides a first constellation density; modulating second data signals with the digital data; transmitting the second data signals across a second telecommunication line segment that is bound within a cable; selecting a second constellation density for use in the modulating step such that the second data signals are spectrally compatible with other signals transmitted across a third telecommunication line segment bound within the cable, wherein the second constellation density is higher than the first constellation density.

31 Claims, 5 Drawing Sheets

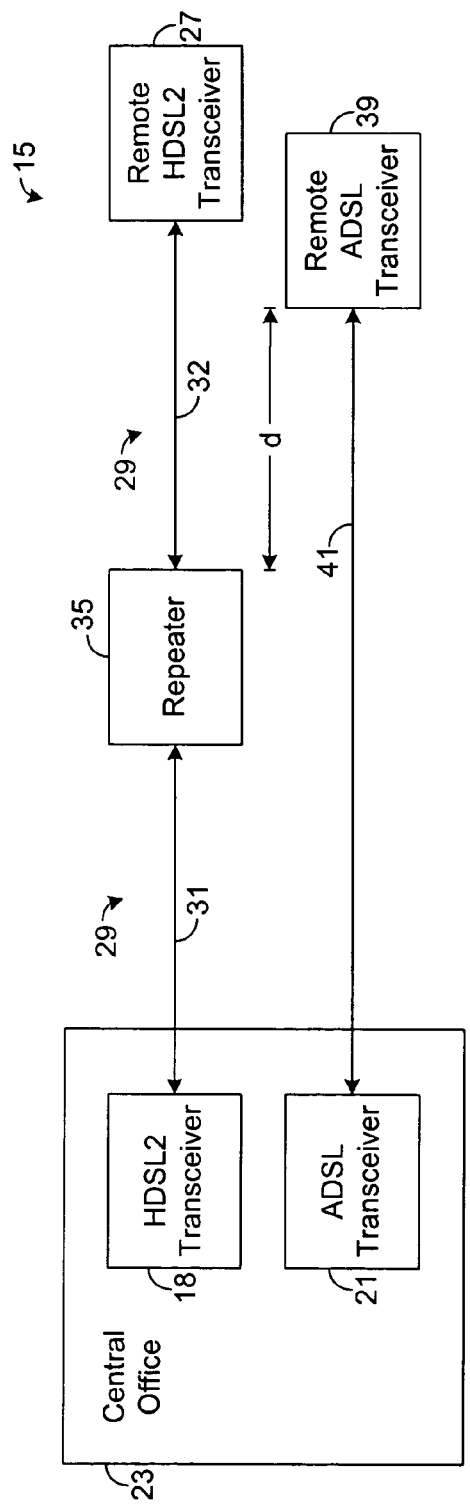
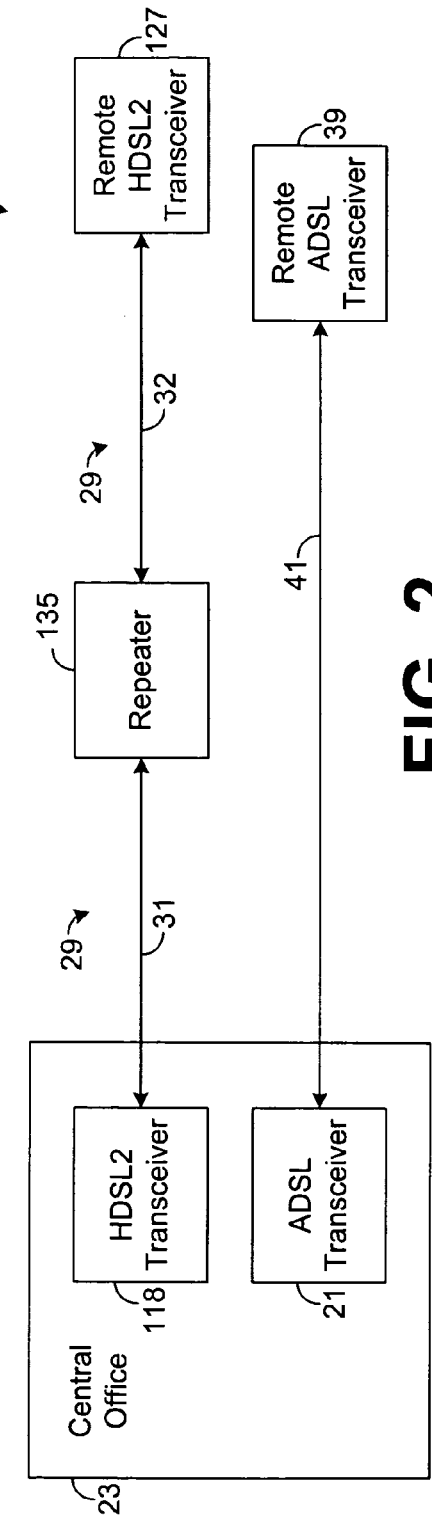
FIG. 1 (Prior Art)
FIG. 2

REPEATER FOR REGENERATING SPECTRALLY COMPATIBLE SIGNALS ALONG A TELECOMMUNICATION LINE

RELATED ART

Segments of telecommunication lines are usually bundled in cables that extend over large distances from transceivers at a central office to transceivers at remote locations, sometimes referred to as "customer premises." Signals communicated across telecommunication line segments bundled within the same cable couple from line-to-line causing crosstalk. The crosstalk between signals using the same frequencies may degrade signal performance and may limit the cable's capacity or data rate.

A wide variety of telecommunication technologies may be used to communicate across telecommunication line segments bound by the same cable. In order to allow signals from different technologies to co-exist in the same cable, spectrum management standards (e.g., T1.417-2001 Spectrum Management for Loop Transmission) have been developed. Such standards specify crosstalk limits to ensure that crosstalk will not reduce signal quality below a specified level. A telecommunication service provider must ensure that signals communicated by its equipment satisfy the limits imposed by applicable spectrum management standards.

Signals that violate the spectrum management standards by causing an unacceptable amount of crosstalk to affect other signals communicated through the same cable are referred to as "spectrally incompatible" with such other signals. Signals that adhere to the spectrum management standards and, therefore, do not induce an unacceptable amount of crosstalk are referred to as "spectrally compatible" with the other signals communicated through the same cable.

DSL services, such as high-data-rate digital subscriber line, second generation (HDSL2) and asymmetric digital subscriber line (ADSL) services, are very popular due to the relatively high data rates and relatively low costs associated with these types of services. HDSL2 transceivers communicate over conventional copper loops and, therefore, are able to utilize a substantial portion of the vast telecommunication copper infrastructure that has been in place for decades.

HDSL2 has two deployment technologies, HDSL2 and HDSL4. HDSL2 transmits a 1.544 Mega-bit per second (Mbps) DS1 payload on a single copper loop. HDSL4 uses a similar transmission technology as HDSL2 but uses two copper loops each carrying half of the 1.544 Mbps DS1 payload. In general, HDSL2 signals communicated in accordance with existing standards can be transmitted with acceptable signal quality up to approximately 9,000 feet (ft) before being regenerated by a repeater. ADSL signals, on the other hand, can often be transmitted up to approximately 18,000 ft without regeneration.

Moreover, HDSL2 and ADSL signals transmitted in accordance with existing standards are spectrally compatible and, therefore, can be transmitted in the same cable up to a point where the HDSL2 signals are regenerated by a repeater. If an HDSL2 signal is regenerated beyond approximately 9,000 feet, then unacceptable interference occurs with ADSL signals communicated in the same cable, and the repeatered HDSL2 signal is, therefore, spectrally incompatible with such ADSL signals. Thus, deployment of HDSL2 is often limited to the first 9,000 ft of a cable that extends from a central office so that regeneration of HDSL2 signals is unnecessary. Such a limitation ensures spectral compatibility between HDSL2 and ADSL signals but undesirably limits the deployment of HDSL2 services.

SUMMARY OF THE DISCLOSURE

Generally, embodiments of the present disclosure pertain to systems and methods for regenerating telecommunication signals using sufficiently high constellation densities to ensure spectral compatibility.

A method in accordance with one exemplary embodiment of the present disclosure comprises the steps of: receiving first data signals from a first telecommunication line segment; demodulating the first data signals, thereby recovering digital data, using a constellation providing a first constellation density; modulating second data signals with the digital data; transmitting the second data signals across a second telecommunication line segment that is bound within a cable; selecting a second constellation density for use in the modulating step such that the second data signals are spectrally compatible with other signals transmitted across a third telecommunication line segment bound within the cable, wherein the second constellation density is higher than the first constellation density.

A method in accordance with another exemplary embodiment of the present disclosure comprises the steps of: receiving first data signals from a first telecommunication line segment; demodulating the first data signals to recover digital data using a constellation that provides a first constellation density; modulating second data signals with the digital data; transmitting the second data signals across a second telecommunication line segment that is bound within a cable; and selecting a higher constellation density for use in the modulating step, as compared to the first constellation density, and spectrally shaping the second data signals based on the selected higher constellation density such that the second data signals are spectrally compatible with other signals transmitted across a third telecommunication line segment bound within the cable.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1 is a block diagram illustrating a conventional communication system.

FIG. 2 is a block diagram illustrating a communication system in accordance with an exemplary embodiment of the present disclosure.

DETAILED DESCRIPTION

Figure 3:
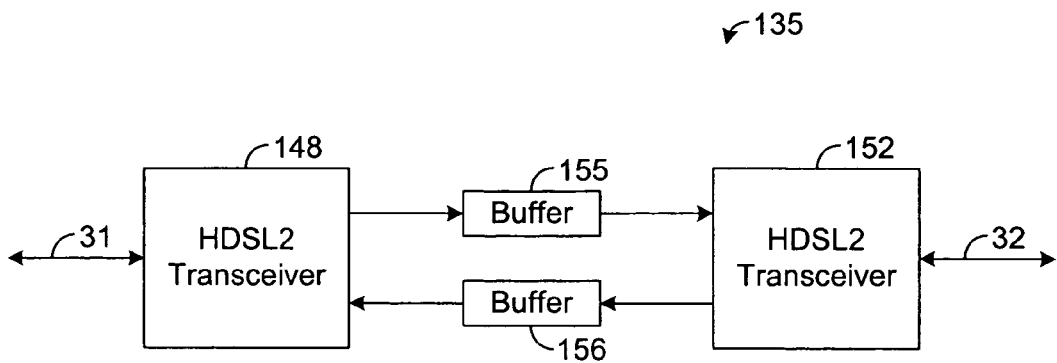
FIG. 3 is a block diagram illustrating a repeater depicted in FIG. 2.

Embodiments of the present disclosure pertain to systems and methods for regenerating signals along a telecommunication line using a constellation that provides a sufficiently high constellation density for ensuring that the signals are spectrally compatible with other signals communicated through the same cable. A system in accordance with an exemplary embodiment of the present disclosure comprises a telecommunication line that provides a communication channel between a central office transceiver and a remote transceiver. Segments of the telecommunication line are coupled to a repeater, which regenerates signals communicated along the telecommunication line. In forming the regenerated signals, the repeater uses a constellation providing a sufficiently high constellation density to ensure that the regenerated signals are spectrally compatible with other signals communicated within a close proximity of the regenerated signals (e.g., communicated through the same cable).

FIG. 1 depicts a conventional telecommunication system 15. The system 15 of FIG. 1 comprises a high-data-rate digital subscriber line, second generation (HDSL2) transceiver 18 and an asymmetric digital subscriber line (ADSL) transceiver 21 residing at a central office 23 of a telecommunication network. The HDSL2 transceiver 18 of FIG. 1 communicates with a remote HDSL2 transceiver 27 via a telecommunication line 29. The telecommunication line 29 depicted in FIG. 1 has two repeaterless segments 31 and 32, each of which comprises a twisted wire pair, sometimes referred to as a "loop." Segment 31 couples the HDSL2 transceiver 18 of the central office 23 to a repeater 35, and segment 32 couples the repeater 35 to the remote HDSL2 transceiver 27. Note that the remote HDSL2 transceiver 27 may reside at a customer premises or may reside within another repeater in the event that telecommunication line 29 extends beyond the remote HDSL2 transceiver 27.

The ADSL transceiver 21 communicates with a remote ADSL transceiver 39 over a repeaterless telecommunication line segment 41, which comprises a twisted wire pair. The ADSL transceiver 39 resides at a customer premises.

In accordance with current HDSL2 and ADSL specifications, as defined by T1.418, the repeater 35 may be positioned up to approximately 9,000 feet (ft) from the central office 23, and the remote HDSL2 transceiver 27 may be positioned up to approximately 9,000 feet from the repeater 35 (i.e., approximately 18,000 feet from the central office 23). Further, the remote ADSL transceiver 39 may be positioned up to approximately 18,000 ft from the central office 23. For illustrative purposes, assume that each of the transceivers 27 and 39, as well as the repeater 35, are positioned at their maximum respective distances from the central office 23.

In the instant embodiment in which HDSL2 signals are communicated across telecommunication line 29, pulse amplitude modulation (PAM) is used to form such signals. However, other types of signals may be communicated across telecommunication line 29 in other embodiments, and these signals may be formed using other types of modulation schemes, such as quadrature amplitude modulation (QAM). For example, the signals communicated over telecommunication lines 29 and 41 may be in accordance with HDSL2, HDSL4, G.SHDSL.bis, SDSL, or other known or future-developed standards. In amplitude modulation, such as PAM or QAM, a constellation is used to map digital data words to points or levels, referred to as "symbols," corresponding to the values of the digital data words. In this regard, a constellation defines different symbols to which digital data words can be mapped, and the total number of symbols within a constellation controls the size of the data words that may be mapped by the constellation.

Moreover, "constellation density" is a term that refers to the number of payload bits that are mapped per symbol by a given constellation. For example, if a constellation enables 3.0 payload bits to be mapped per symbol, then the constellation is said to provide a constellation density of 3.0. Thus, a transmitter that modulates data using a constellation providing a constellation density of 3.0, outputs symbols that each contain 3.0 bits of payload information, and a transmitter that modulates data using a constellation providing a constellation density of 4.0, outputs symbols that each contain 4.0 bits of payload information.

If error correction is not employed, then a constellation having a density of 3.0 generally has eight different symbols to which data words can be mapped. In such an embodiment, each data word has three bits, all of which define payload information, and there is one symbol for each possible value of a data word. However, if error correction is employed, then a constellation providing a constellation density of 3.0 generally has a number of symbols greater than eight to accommodate the additional error checking bit or bits. For example, in Trellis coded PAM, it is common to define code words having three bits of payload information and one bit for error checking. In such an embodiment, each code word is four bits in length. Therefore, a constellation having a constellation density of 3.0 in such an embodiment has sixteen different symbols (i.e., one symbol for each possible code word value).

The constellation density of a constellation used to modulate data transmitted over a telecommunication line affects signal performance. In general, increasing the constellation density enables the same amount of payload information to be communicated at a lower bandwidth. However, for a given length of a telecommunication line segment, increasing the constellation density reduces the signal quality of the signals transmitted over the line segment. Thus, to keep the signal quality of such signals within an acceptable range, the acceptable maximum length of a repeaterless telecommunication line segment is often significantly reduced as the constellation density for the signals communicated over the segment is increased. Moreover, in selecting the constellation density, significant trade-offs exist between bandwidth, signal quality, and reach (i.e., maximum possible repeaterless line length).

It is generally well known that a constellation density of a little less than 3.0 provides an optimum solution for PAM considering the factors of bandwidth, signal quality, and reach. Thus, conventional PAM transceivers are typically configured to communicate using constellations providing constellation densities of 3.0. Accordingly, the transceivers 18 and 27 depicted by FIG. 1, as well as transceivers (not shown) included in the repeater 35, are configured to transmit symbols that contain three bits of payload information.

In some embodiments, it is possible for the telecommunication line segments 32 and 41 to be positioned in close proximity to one another (e.g., bound within the same cable). When the segments 32 and 41 extending across distance d are bound within the same cable, an unacceptable level of crosstalk, as defined by T1.417, induced by the regenerated signals transmitted across segment 32 interferes with the signals transmitted across segment 41. In other words, the regenerated HDSL2 signals transmitted across segment 32 are spectrally incompatible with the ADSL signals transmitted across segment 41.

Significant effort has been expended to modify the regenerated signals transmitted across segment 32 in order to make these signals spectrally compatible with the signals transmitted across segment 41. For example, various techniques for spectrally shaping and adjusting the power levels of the signals transmitted by the repeater 35 have been employed in an effort to make these signals spectrally compatible. Unfortunately, such conventional efforts have been unsuccessful.

Thus, to provide HDSL2 services to the HDSL2 transceiver 27, service providers are generally faced with a decision to either ensure that segment 32 is not bundled in the same cable with an ADSL telecommunication line segment or to allow the signals transmitted across segment 32 to be spectrally incompatible as defined by T1.417. Moreover, many service providers simply choose to limit HDSL2 service to distances of less than approximately 9,000 ft from the central office in order to avoid the incompatibility problems described above.

FIG. 2 depicts a telecommunication system 100 in accordance with an exemplary embodiment of the present disclosure. As can be seen by comparing FIGS. 1 and 2, the system 100 may be similar to the conventional communication system 15 described above. Indeed, components having the same reference number in FIGS. 1 and 2 are identically configured. However, the configuration of repeater 135 and HDSL2 transceivers 118 and 127 of FIG. 2 are different than the configuration of repeater 35 and HDSL2 transceivers 18 and 27, respectively, of FIG. 1. In this regard, rather than communicating signals across segment 32 using a constellation that provides a constellation density of 3.0, the repeater 135 and transceiver 127 of FIG. 2 communicate signals across segment 32 using a constellation that provides a constellation density higher than 3.0. In a preferred embodiment, the repeater 135 and transceiver 127 use a constellation having a density of 4.0, although other constellation densities higher than 3.0 may be used in other embodiments.

By increasing the constellation density used to modulate and demodulate the signals transmitted across segment 32, as compared to conventional system 15, it is possible for such signals to have a lower bandwidth. Indeed, by using a constellation density of 4.0 or higher, it is possible, to transmit signals across segment 32 such that these signals are spectrally compatible, as defined by T1.417, with the ADSL signals transmitted across segment 41 even when the telecommunication line segments 32 and 41 are in close proximity (e.g., bound within the same cable). Moreover, by using a higher constellation density, as described above, the afore-described incompatibly problems plaguing HDSL2 service providers in conventional systems can be avoided.

Note that by using spectral shaping and/or power back-off techniques for the signals transmitted across segment 32, it is possible to reduce the minimum constellation density that is sufficient for ensuring spectral compatibility. In this regard, spectral shaping generally refers to processes that modify the spectral shape of transmitted signals, and power back-off generally refers to processes that reduce the transmission power of transmitted signals. Such spectral shaping and/or power back-off techniques may be used to lower crosstalk effects within selected bandwidths in an effort to make transmitted signals spectrally compatible.

As an example, assume that the signals transmitted by repeater 135 across telecommunication line segment 32 cause an unacceptably high level of crosstalk in a particular bandwidth. In such an example, power back-off techniques may be used to lower the transmission power level of the repeater 135 for the particular bandwidth. Lowering the transmission power level has the effect of reducing the crosstalk occurring in the particular bandwidth, and it is possible for the power back-off techniques to reduce the crosstalk in the particular bandwidth to a low enough level such that the transmitted signals become spectrally compatible. Indeed, analyses have shown that, when spectral shaping and power back-off techniques, as well as modulation using a constellation that provides a constellation density of 4.0, are employed to transmit HDSL2 signals across segment 32, it is possible for such signals to be spectrally compatible with ADSL signals communicated across segment 41, assuming a symmetric payload of 1.544 megabits per second (Mbps) across segment 32, a length of 14.5 kft or less for segment 41, and 26 AWG for segments 32 and 41.

FIG. 3 depicts an exemplary configuration of the repeater 135. The repeater 135 of FIG. 3 comprises an HDSL2 transceiver 148 coupled to telecommunication line segment 31 and an HDSL2 transceiver 152 coupled to telecommunication line segment 32. Further, each of the HDSL2 transceivers 148 and 152 is coupled to a set of buffers 155 and 156. Signals received from the segment 31 by the HDSL2 transceiver 148 are demodulated by the transceiver 148. In one exemplary embodiment, the transceiver 148 communicates with the central office HDSL2 transceiver 118 (FIG. 2) using a constellation that provides a constellation density of 3.0. In such an embodiment, each received symbol is demodulated to recover three bits of payload information. Such data is then transmitted to buffer 155, which buffers the data before transmitting it to HDSL2 transceiver 152.

As described above, the data communicated across segment 32 are preferably modulated using a constellation that provides a constellation density 4.0. In such an embodiment, each symbol communicated across segment 32 by transceiver 152 contains four bits of payload information.

Signals received from the segment 32 by the HDSL2 transceiver 152 are demodulated by the transceiver 152. As described above, in a preferred embodiment, each of the HDSL2 transceivers 127 and 152 uses a constellation that provides a constellation density of 4.0. In such an embodiment, each symbol received by HDSL2 transceiver 152 is demodulated to recover four bits of payload information. The demodulated data is then transmitted to buffer 156, which buffers the data before transmitting it to HDSL2 transceiver 148.

The HDSL2 transceiver 148 modulates the digital data received from buffer 156 to form signals that are then transmitted across segment 31. In a preferred embodiment, the transceiver 148 modulates the foregoing data using a constellation that provides a constellation density of 3.0. In such an embodiment, each symbol communicated across segment 31 by transceiver 148 contains three bits of payload information.

As described above, it is possible for HDSL2 signals transmitted across segment 31 to be spectrally compatible with ADSL signals transmitted across segment 41 even when the HDSL2 signals are modulated via a constellation providing a constellation density of 3.0. Further, a constellation density of 3.0 is close to optimum in considering bandwidth, signal quality and reach. Thus, having the HDSL2 transceivers 148 (FIG. 3) and 118 (FIG. 2) communicate based on a constellation density of 3.0 generally provides an optimal solution. However, other types of constellation densities are possible in other embodiments. For example, if desired, the HDSL2 transceiver 148, like the HDSL2 transceiver 152 described above, may be configured to communicate with the central office HDSL2 transceiver 118 (FIG. 2) using a constellation that provides a constellation density of 4.0 or higher.

When transceivers 127 and 152 are configured to communicate HDSL2 signals, the following equation may be used to define the power spectral density (PSD) of transceivers 127 and 152:

$$PSD(f) = \begin{cases} 10^{\frac{-PBO}{10}} \times \frac{K_{transmit}}{135} \times \frac{1}{f_{sym}} \times \frac{\left[\sin\left(\frac{\pi f}{f_{sym}}\right)\right]^2}{\left(\frac{\pi f}{f_{sym}}\right)^2} \times \frac{1}{1+\left(\frac{f}{f_{3dB}}\right)^{2\times order}} \times \frac{f^2}{f^2 + f_c^2}, f < f_{int} \\ 0.5683 \times 10^{-4} \times f^{-1.5}, f_{int} \leq f \leq 1.1 \text{MHz} \end{cases}$$

where $K_{transmit}$, order, $f_{sym}$, and $f_{3db}$ are specified below in Table 1 and where $f_{int}$ is the frequency at which the PSD functions of transceivers 127 and 152 are equal.

TABLE 1

|  | $K_{transmit}$ | order | $f_{sym}$ (kHz) | F3dB |
|---|---|---|---|---|
| Repeater Transceiver 152 | 7.86 | 6 | x/n | $f_{sym}/2$ |
| Remote Transceiver 127 | 8.32 | 6 | x/n | $0.9 \times f_{sym}/2$ |

For HDSL2, x equals 1552 kilo-Hertz (kHz), which corresponds to 1544 kHz data channel and 8 kHz control channel. Further, n corresponds to the constellation density used by transceivers 152 and 148. In the instant embodiment where transceivers 152 and 127 employ a four-bit constellation density, n is equal to 4.0.

Figure 4:
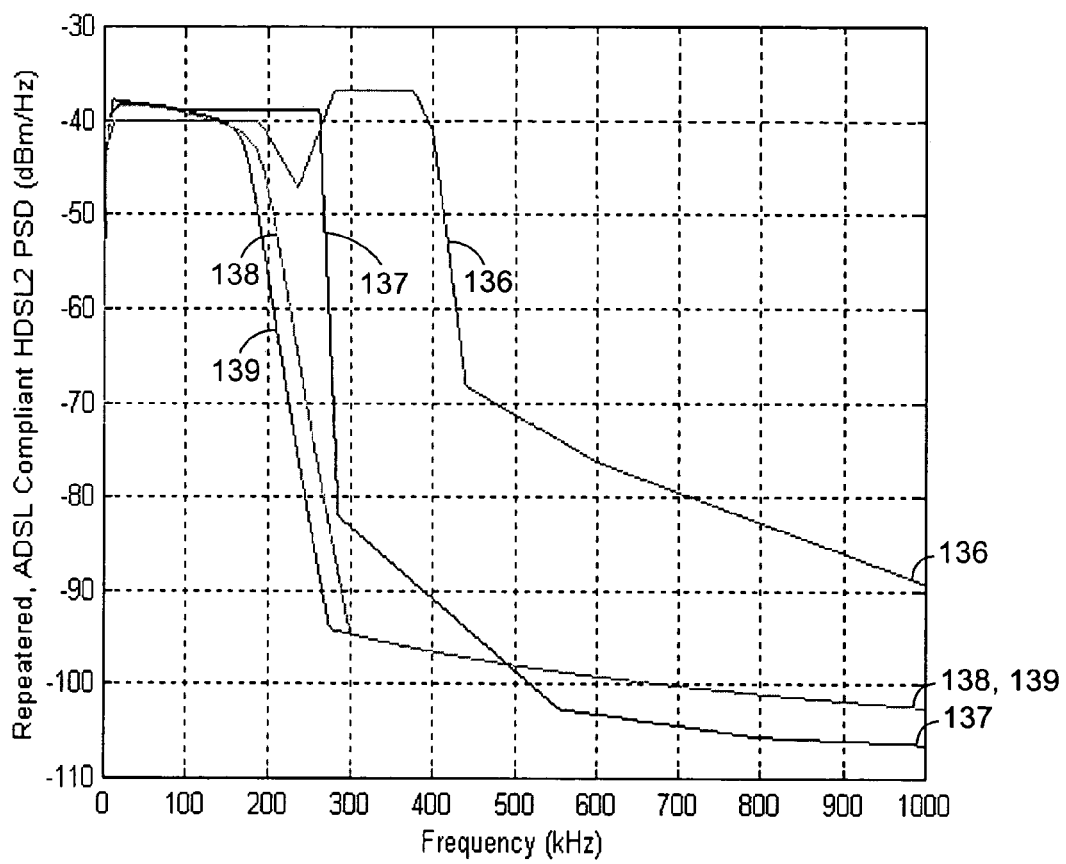
FIG. 4 is a graph illustrating exemplary power spectral density (PSD) functions for HDSL2 transceivers communicating across one of the tele-communication lines of FIG. 2.

FIG. 4 depicts exemplary PSD functions for the transceivers 118, 127, 148, and 152. Curve 136 represents an exemplary PSD function for HDSL2 transceiver 118 in accordance with HDSL2 standards when this transceiver 118 employs a constellation providing a constellation density of 3.0. Curve 137 represents an exemplary PSD function for HDSL2 transceiver 148 in accordance with HDSL2 standards when this transceiver 148 employs a constellation providing a constellation density of 3.0. Curve 138 represents an exemplary PSD function for HDSL2 transceiver 152 when this transceiver 152 employs a constellation providing a constellation density of 4.0, and curve 139 represents an exemplary PSD function for HDSL2 transceiver 127 when this transceiver 118 employs a constellation providing a constellation density of 4.0. Note that curves 138 and 139 may be obtained from the PSD function specified above using the values specified in Table 1 and setting the value of PBO (power back-off) to 0.

Table 2 below specifies exemplary PBO values that may be used for the PSD functions depicted in FIG. 4 to ensure that the HDSL2 signals communicated by transceivers 118, 127, 148 and 152 are spectrally compatible with the ADSL signals communicated by transceivers 21 and 39 when such HDSL2 and ADSL signals are propagated through the same binder or binders. Note that the values of Table 2 are based on transceivers 127 and 152 using a constellation density 4.0.

TABLE 2

| Telecommunication line segment 31 | | Telecommunication line segment 32 | |
|---|---|---|---|
| Loop Reach - 26 AWG (kft) | PBO (dB) | Loop Reach - 26 AWG (kft) | PBO (dB) |
| length ≧ 8.0 | 0 | length ≧ 5.5 | 0 |
| 8.0 > length ≧ 7.5 | 1 | 5.5 > length ≧ 5.0 | 1 |
| 7.5 > length ≧ 7.0 | 2 | 5.0 > length ≧ 4.5 | 2 |
| 7.0 > length ≧ 6.5 | 3 | 4.5 > length ≧ 4.0 | 4 |
| 6.5 > length ≧ 5.5 | 5 | 4.0 > length ≧ 3.5 | 6 |
| 5.5 > length ≧ 4.5 | 8 | 3.5 > length ≧ 3.0 | 8 |
| 4.5 > length ≧ 3.0 | 10 | 3.0 > length ≧ 1.5 | 10 |
| 3.0 > length ≧ 2.0 | 12 | 1.5 > length ≧ 1.0 | 11 |
| 2.0 > length | 15 | 1.0 > length | 15 |

As an example, if the length of segment 32 is between 3,500 feet and 4,000 feet, then it can be ensured that the HDSL2 signals communicated by transceivers 127 and 152 are spectrally compatible with ADSL signals communicated by transceivers 21 and 39 through the same binder, if the PSD functions for transceivers 127 and 152 shown by FIG. 4 are backed-off by 6 decibels (dB). If the length of segment 31 is between 7,500 feet and 7,000 feet, then it can be ensured that the HDSL2 signals communicated by transceivers 118 and 148 are spectrally compatible with ADSL signals communicated by transceivers 21 and 39 through the same binder, if the PSD functions for transceivers 118 and 148 shown by FIG. 4 are backed-off by 2 decibels (dB). Thus, by employing the transmit power spectrums depicted by FIG. 4 and backing off the transmit power according to Table 2, it can be ensured that the HDSL2 signals communicated by transceivers 118, 148, 152, and 127 are spectrally compatible with the ADSL signals communicated by transceivers 21 and 39.

Note that spectral compatibility is ensured if the specified PBO values specified in Table 2 are applied across all of the transmitted frequencies. However, in some embodiments, it is possible to use PBO values other than those specified in Table 2, and it is possible to apply different PBO values to different bandwidths instead of applying the same PBO value across all of the transmitted frequencies.

Figure 5:
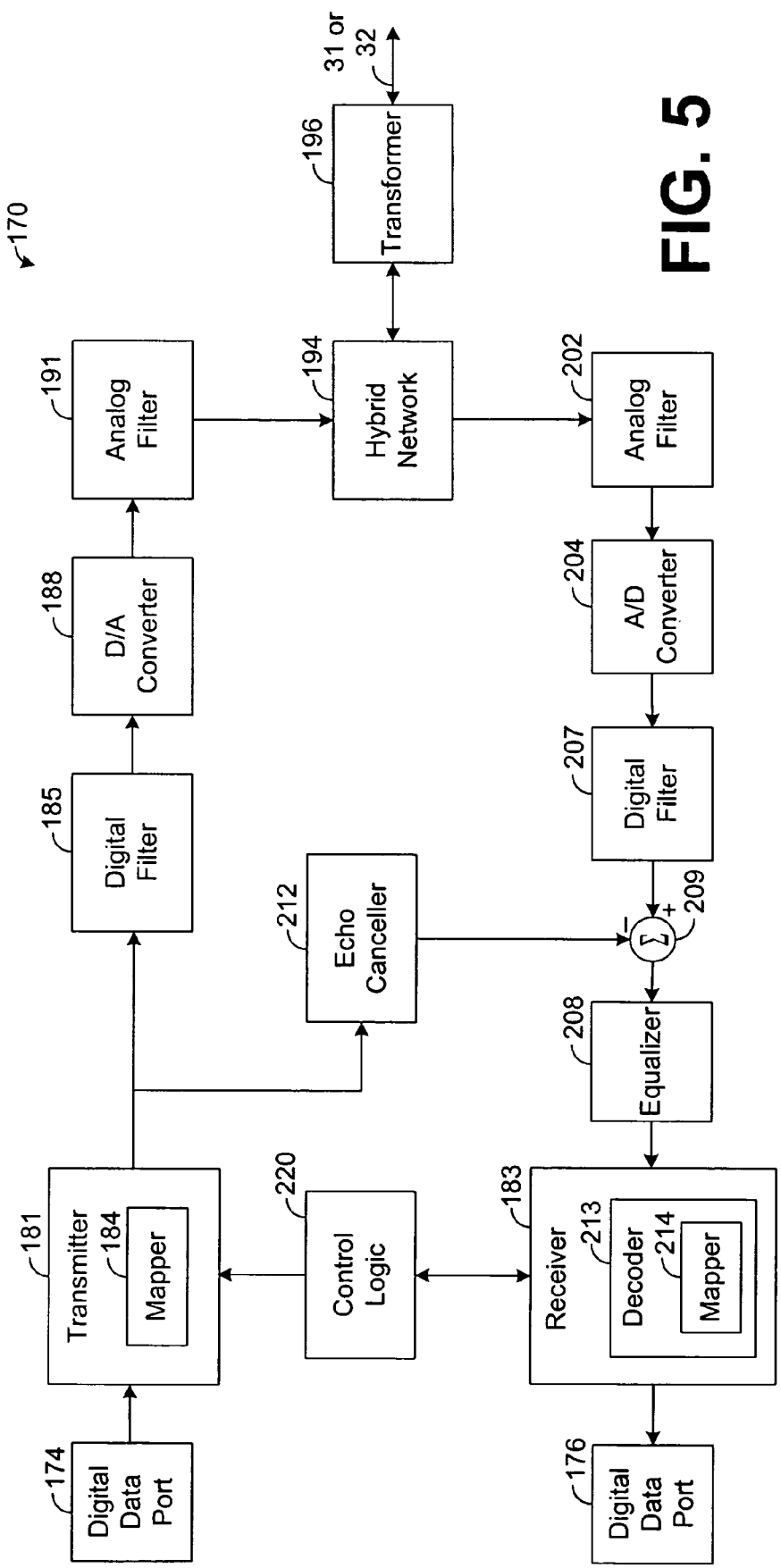
FIG. 5 is a block diagram illustrating an exemplary transceiver that may be used to implement one or more transceivers depicted in FIGS. 2 and 3.

FIG. 5 depicts an exemplary transceiver 170 that may be used to implement any of the HDSL2 transceivers 118, 127, 148, or 152 of FIGS. 2 and 3. The transceiver 170 of FIG. 5 comprises a pair of digital data ports 174 and 176. If the transceiver 170 is used to implement HDSL2 transceiver 152 of FIG. 3, then the digital data port 174 is coupled to and receives digital data from the buffer 155. Further, the digital data port 176 is coupled to and transmits digital data to the buffer 156. If the transceiver 170 is used to implement HDSL2 transceiver 148 of FIG. 3, then the digital data port 174 is coupled to and receives digital data from the buffer 156. Also, the digital data port 176 is coupled to and transmits digital data to the buffer 155.

As shown by FIG. 5, the transceiver 170 comprises a transmitter 181 and a receiver 183. The transmitter 181 has a mapper 184 for mapping the digital data from the digital data port 174 to symbols using a selected constellation, as will be described in more detail hereinbelow. Thus, the transmitter 181 outputs a data signal that comprises the digital data received from the digital data port 174. A digital filter 185 receives and filters the data signal output by transmitter 181 to provide a filtered digital signal to a digital-to-analog (D/A) converter 188. The D/A converter 188 converts the filtered digital signal into an analog signal, which is filtered by an analog filter 191. This filtered analog signal is then applied, via a hybrid network 194 and a line-coupling transformer 196, to the telecommunication line segment 31 or 32 that is coupled to the transformer 196. In this regard, if the transceiver 170 is used to implement HDSL2 transceiver 127 or 152, then the transformer 196 is coupled to telecommunication line segment 32. If the transceiver 170 is used to implement HDSL2 transceiver 118 or 148, then the transformer 196 is coupled to telecommunication line segment 31.

An analog signal on the telecommunication line segment 31 or 32 is coupled through transformer 196 and hybrid network 194 and is applied to an analog filter 202, which filters the received analog signal and provides a filtered analog signal to an analog-to-digital (A/D) converter 204. The A/D converter 204 converts the filtered analog signal into a digital signal, which is filtered by a digital filter 207. A differential summer 209 combines this filtered digital signal with an echo cancellation signal from an echo canceller 212 in order to cancel, from the filtered digital signal, echoes of signals transmitted by the transceiver 170 over the telecommunication line segment 31 or 32 that is coupled to the transformer 196. The combined signal from the differential summer 209 is then coupled through a channel equalizer 208 to remove intersymbol interference (ISI) and then received by the receiver 183.

The receiver 183 has a decoder 213, such as a Viterbi decoder, for example, although other types of decoders may be used in other examples. The decoder 213 has an inverse mapper 214, which maps the symbols received from the equalizer 208 to digital data using a selected constellation, as will be described in more detail hereinbelow. Such digital data is transmitted to the digital data port 176, which outputs this digital data from the transceiver 170.

Figure 6:
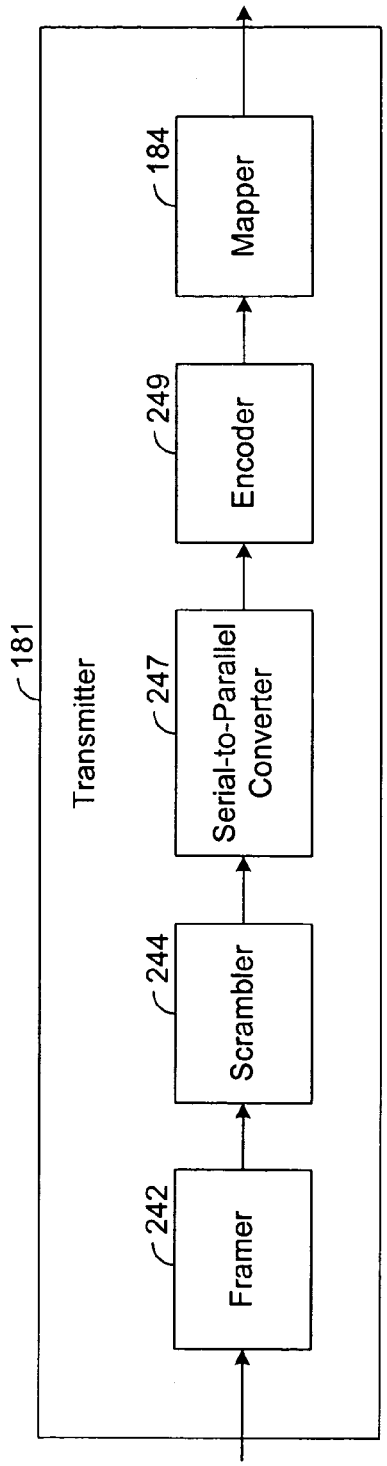
FIG. 6 is a block diagram illustrating an exemplary embodiment of a transmitter depicted in FIG. 5.
Figure 7:
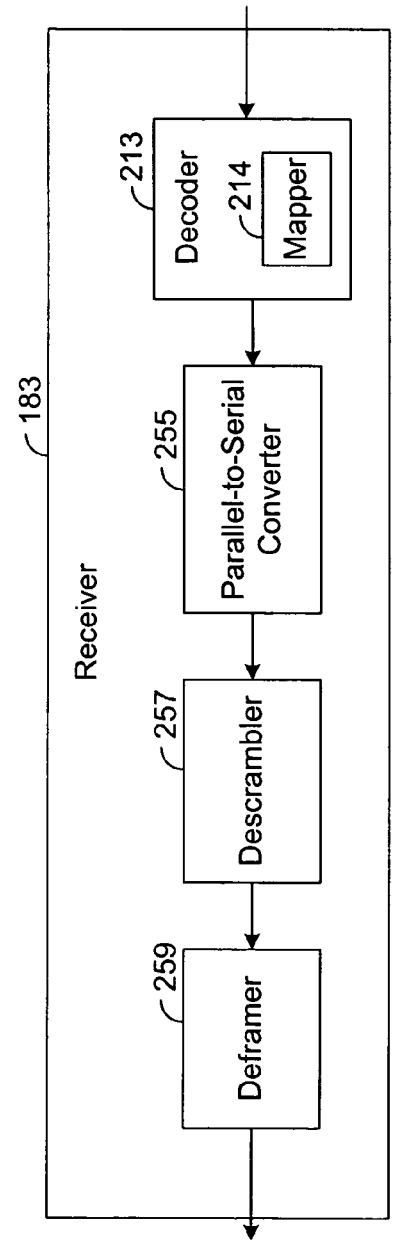
FIG. 7 is a block diagram illustrating an exemplary embodiment of a receiver depicted in FIG. 5.

FIGS. 6 and 7 depict exemplary embodiments of the transmitter 181 and receiver 183, respectively. For illustrative purposes, transmitter 181 will be described hereafter as performing Trellis coded PAM to provide code words of four payload bits and one error checking bit. Such code words are mapped into symbols using a constellation that provides a constellation density of 4.0. However, in other examples, other configurations of the transmitter 181 and receiver 183 are possible. For example, it is unnecessary for error correction encoding to be performed, and data words of other bit lengths may be used. Further, other types of coding may be used to encode and decode code words, and constellations having different constellation densities may be used in other embodiments.

Digital data from the data port 174 (FIG. 5) is respectively framed and scrambled by framer 242 and scrambler 244. A serial-to-parallel converter 247 converts the serial stream of data from scrambler 244 to four-bit data words. A Trellis encoder 249 encodes each four-bit data word with an additional error checking bit to provide a five-bit data word. The mapper 184 maps each five-bit data word into a symbol using a constellation that provides a constellation density of 4.0. In such an embodiment, the constellation has thirty-two different symbols (i.e., one symbol for each possible value of the five-bit encoded data words). Note that encoding techniques other than Trellis encoding may be employed by encoder 249 in other embodiments.

In FIG. 7, the signals received by receiver 183 are decoded into five bit code words by decoder 213. Each code word comprises four payload bits and one error correction bit. The decoder 213 outputs the four payload bits of each code word to a parallel-to-serial converter 255 that converts the data words into serial data. A descrambler 257 and deframer 259 then respectively descramble and deframe the data from the parallel-to-serial converter 255.

As shown by FIG. 5, the transceiver 170 comprises control logic 220 that is in communication with the transmitter 181 and the receiver 183. Note that the control logic 220 may be implemented in hardware, software, or a combination thereof. The control logic 220 is configured to dynamically select a constellation based on its constellation density and to then instruct the mapper 184 and mapper 214 to use the selected constellation.

In this regard, if the transceiver 170 is used to implement the HDSL2 transceiver 127 (FIG. 2) or 152 (FIG. 3), then the control logic 220 preferably instructs the transmitter 181 and receiver 183 to use a constellation providing a constellation density of 4.0. In such an embodiment, the mapper 184 maps each five-bit data word (four payload bits and one error checking bit) received from encoder 249 (FIG. 6) to a single respective symbol, as described above. As a result, each symbol communicated across telecommunication line segment 32 contains four bits of payload information.

However, if the transceiver 170 is used to implement the HDSL2 transceiver 118 or 148 (FIG. 3), then the control logic 220 preferably instructs the transmitter 181 and receiver 183 to use a constellation providing a constellation density of 3.0. In such an embodiment, the mapper 184 encodes each four-bit data word (three payload bits and one error checking bit) received from encoder 249 (FIG. 6) to a single respective symbol. Note that central office HDSL2 transceiver 118 is similarly configured to use the same type of constellation that is used by transceiver 148. Therefore, each symbol communicated across telecommunication line segment 31 contains three bits of payload information.

Various techniques may be used to enable the control logic 220 to select the appropriate constellation. In one exemplary embodiment, the control logic 220 selects the appropriate constellation based on a duration of at least one pulse received by the transceiver 170 during training. In this regard, according to current standards, transceivers implemented at a central office (C.O.) transmit 0.2 second pulses, and non-C.O. transceivers transmit 0.3 second pulses. The control logic 220 preferably uses this pulse duration difference to select a constellation providing the appropriate constellation density.

Figure 8:
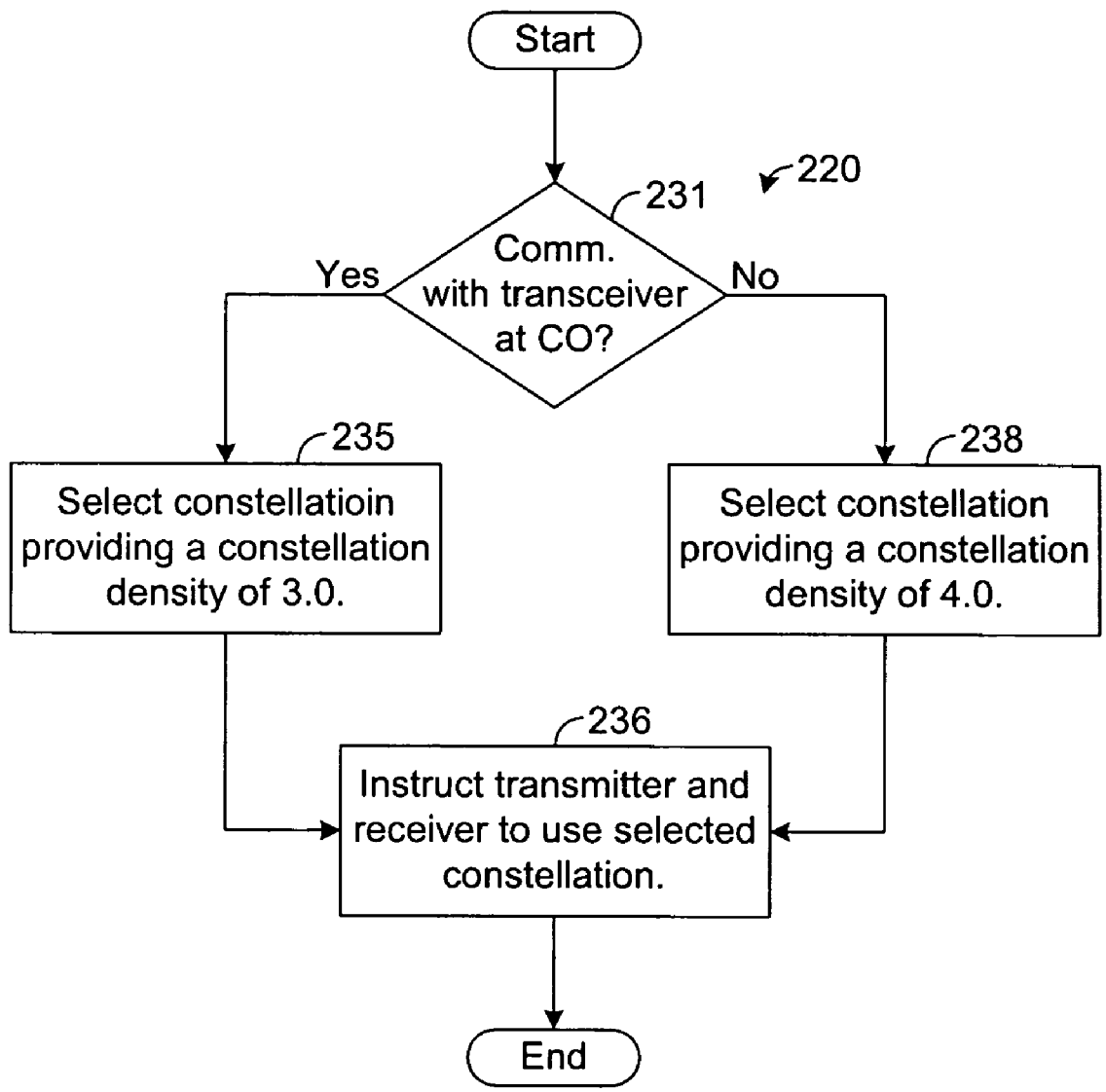
FIG. 8 is a flow chart illustrating an exemplary architecture and functionality of control logic depicted in FIG. 5.

In particular, in block 231 of FIG. 8, the control logic 220 determines whether the duration of pulses received by the transceiver 170 during training is 0.2 seconds or 0.3 seconds. If the transceiver 170 is receiving 0.2 second pulses during training, then the control logic 220 determines that the transceiver 170 is in communication with another transceiver that is located at a central office. In such an embodiment, the control logic 220 instructs the transmitter 181 and receiver 183 to use a constellation providing a constellation density of 3.0, as shown by blocks 235 and 236 of FIG. 8. However, if the receiver 183 is receiving 0.3 second pulses during training, then the control logic 220 determines that the transceiver 170 is in communication with a non-C.O. transceiver. In such an embodiment, the control logic 220 instructs the transmitter 181 and receiver 183 to use a constellation providing a constellation density of 4.0, as shown by blocks 238 and 236.

Thus, in operation, the HDSL2 transceivers 127 (FIG. 2) and 152 (FIG. 3) enter into a training mode prior to entering into a data mode. In the training mode, transceiver 152 transmits 0.3 second pulses across telecommunication line segment 32 similar to existing standards and protocols. Based on the duration of the 0.3 second pulses, transceiver 127 selects a constellation providing a constellation density of 4.0. After completing the training mode and entering into the data mode, the HDSL2 transceivers 127 and 152 communicate with each other using the selected constellation. Signals received by the transceiver 152 from the telecommunication line segment 32 are demodulated to recover digital data, which is buffered by buffer 156. Digital data buffered by buffer 155 is modulated by the transceiver 152 before being transmitted across telecommunication line segment 32.

In another embodiment, it is possible for transceiver 127 to be coupled to a central office transceiver (not shown) over a repeaterless telecommunication line segment. In such an embodiment, the transceiver 127 receives 0.2 second pulses instead of 0.3 second pulses in accordance with existing standards and protocols, and the transceiver 127 would, therefore, select a constellation providing a constellation density of 3.0.

The other transceivers 118, 148, and 152 may be similarly configured to select the appropriate constellation density based on training signals such that the transceivers 118 and 148 select and use a constellation providing a constellation density of 3.0 and such that the transceiver 152 selects and uses a constellation providing a constellation density of 4.0. However, it is possible for any of the transceivers 118, 127, 148, and 152 to be hardcoded to select and use the appropriate constellation. For example, in one exemplary embodiment, the remote transceiver 127 is configured to adaptively select, based on training signals, a constellation density providing a constellation density of 4.0. However, the transceivers 118 and 148 are hardcoded to use a constellation providing a constellation density of 3.0, and the transceiver 152 is configured to use a constellation providing a constellation density of 4.0.

It should be noted that repeater 135 has generally been described as operating in an HDSL2 environment. However, the techniques described herein for making HDSL2 signals spectrally compatible with ADSL signals may be employed in other types of environments to make other types of signals (i.e., non-HDSL2 signals) spectrally compatible with other signals communicated through the same cable. In addition, the transceivers 118, 148, 152, and 127 have been described herein as using PAM. However, in other embodiments, other types of modulation may be employed such as quadrature amplitude modulation (QAM), for example.

Now, therefore, the following is claimed:

1. A repeater for regenerating signals communicated across a telecommunication line extending from a central office of a telecommunication network to a customer premises, comprising:

a receiver coupled to a first telecommunication line segment of the telecommunication line, the first telecommunication line segment extending from the central office to the repeater, the receiver configured to receive a first data signal from the first telecommunication line segment, the receiver configured to demodulate the first data signal to recover digital data by using a constellation that provides a first constellation density, the first data signal having a spectral shape; and a transmitter coupled to the receiver and a second telecommunication line segment of the telecommunication line, the second telecommunication line segment bound within a cable, the transmitter configured to form a second data signal comprising the digital data by using a constellation that provides a second constellation density, the transmitter further configured to transmit the second data signal across the second telecommunication line segment, wherein the second constellation density is higher than the first constellation density, wherein the transmitter is configured to control a spectral shape of the second data signal such that the second data signal is spectrally compatible with signals transmitted along a third telecommunication line segment bound within the cable, and wherein the spectral shape of the second data signal is different than the spectral shape of the first data signal and is based on the second constellation density.

2. The repeater of claim 1, wherein the second data signal is a pulse amplitude modulated (PAM) signal and wherein the signals transmitted along the third telecommunication line segment are asymmetric digital subscriber line (ADSL) signals.

3. The repeater of claim 1, wherein the first and second data signals are pulse amplitude modulated, wherein the first constellation density is 3.0, and wherein the second constellation density is 4.0.

4. The repeater of claim 1, wherein the first and second data signals are pulse amplitude modulated, and wherein the second constellation density is higher than 3.0.

5. The repeater of claim 1, further comprising control logic configured to adaptively select, based on at least one training signal received by the repeater from the second telecommunication line segment, the second constellation density for use by the transmitter in modulating the second data signal.

6. The repeater of claim 1, wherein the second telecommunication line segment extends from the repeater to a customer premises transceiver.

7. The repeater of claim 1, wherein the repeater is configured to regenerate signals only from a single transmitter at the central office.

8. The repeater of claim 1, wherein the second data signal has a data rate equal to a data rate of the first data signal.

9. The repeater of claim 8, wherein a bandwidth of the second data signal is lower than a bandwidth of the first data signal.

10. The repeater of claim 1, wherein the receiver is a digital subscriber line (DSL) receiver, and wherein the transmitter is a digital subscriber line (DSL) transmitter.

11. The repeater of claim 10, wherein the receiver is a high-data-rate digital subscriber line, second generation (HDSL2) receiver, and wherein the transmitter is a high-data-rate digital subscriber line, second generation (HDSL2) transmitter.

12. The repeater of claim 1, wherein a bandwidth of the second data signal is lower than a bandwidth of the first data signal.

13. A method for regenerating signals communicated across a telecommunication line extending from a central office of a telecommunication network to a customer premises, comprising the steps of:

receiving, from a first telecommunication line segment of the telecommunication line, a first data signal transmitted from the central office, the first telecommunication line segment extending from the central office, the first data signal having a spectral shape;

demodulating the first data signal to recover digital data using a first constellation that provides a first constellation density;

selecting a second constellation that provides a constellation density higher than the first constellation density;

forming a second data signal comprising the digital data using the second constellation selected in the selecting step;

transmitting the second data signal across a second telecommunication line segment of the telecommunication line, the second telecommunication line segment bound within a cable; and controlling the second data signal based on the second constellation such that a spectral shape of the second data signal is different than the spectral shape of the first data signal, wherein the controlling step is performed such that the second data signal is spectrally compatible with other signals transmitted across a third telecommunication line segment bound within the cable.

14. The method of claim 13, wherein the first and second data signals are pulse amplitude modulated, wherein the first constellation density is 3.0, and wherein the second constellation density is 4.0.

15. The method of claim 13, wherein the first and second data signals are pulse amplitude modulated, and wherein the second constellation density is higher than 3.0.

16. The method of claim 13, further comprising the step of receiving at least one training signal from the second telecommunication line segment, wherein the selecting step is based on the training signal.

17. The method of claim 16, wherein the selecting step is based on a duration of the training signal.

18. The method of claim 13, wherein a bandwidth of the second data signal is lower than a bandwidth of the first data signal.

19. The method of claim 18, wherein the second data signal has a data rate equal to a data rate of the first data signal.

20. A method for regenerating signals communicated across a telecommunication line, comprising the steps of:

receiving a first data signal from a first telecommunication line segment of the telecommunication line;

demodulating the first data signal to recover digital data using a first constellation that provides a first constellation density;

forming a second data signal comprising the digital data;

transmitting the second data signal across a second telecommunication line segment of the telecommunication line, the second telecommunication line segment bound within a cable; and ensuring that the second data signal is spectrally compatible with other data signals transmitted across other telecommunication line segments bound within the cable, the ensuring step comprising the steps of selecting, for the modulating step, a second constellation providing a second constellation density higher than the first constellation density and controlling the second data signal based on the second constellation density such that a spectral shape of the second data signal is different than a spectral shape of the first data signal.

21. The method of claim 20, wherein the modulating step is adaptively performed based on a training signal.

22. The method of claim 20, wherein the second data signal is a pulse amplitude modulated (PAM) signal, and wherein the other signals transmitted across the third telecommunication line segment are asymmetric digital subscriber line signals.

23. The method of claim 20, wherein the ensuring step comprises the step of spectrally shaping the second data signal based on the second constellation selected in the selecting step.

24. The method of claim 20, wherein the selecting step is based on an expected amount of crosstalk interference induced by the second data signals.

25. The method of claim 20, further comprising the steps of:

determining whether signals based on a constellation providing the second constellation density are spectrally compatible relative to at least one other signal, wherein the selecting step is based on the determining step.

26. A communication system, comprising:

a first telecommunication line segment coupled to a network transmitter;

a second telecommunication line segment bound within a cable; and a repeater for regenerating data signals from only the first telecommunication line segment, the repeater coupled to the first and second telecommunication line segments, the repeater configured to receive, from the first telecommunication line segment, a first data signal transmitted by the network transmitter and to demodulate the first data signal to recover digital data by using a first constellation that provides a first constellation density, the repeater further configured to form a second data signal comprising the digital data by using a second constellation that provides a second constellation density that is higher than the first constellation density, wherein the repeater is configured to control a spectral shape of the second data signal such that the second data signal is spectrally compatible with signals transmitted along a third telecommunication line segment bound within the cable, and wherein the spectral shape of the second data signal is different than a spectral shape of the first data signal and is based on the second constellation.

27. The system of claim 26, wherein the second telecommunication line segment extends from the repeater to a customer premises transceiver.

28. The system of claim 26, wherein the repeater is configured to make a determination whether the network transmitter resides at a central office and to select the second constellation for modulating the digital data based on the determination.

29. The system of claim 26, wherein the repeater is configured to make a determination whether a duration of a training signal exceeds a threshold, and wherein the repeater is configured to select the second constellation for modulating the digital data based on the determination.

30. The system of claim 26, wherein the second data signal has a data rate equal to a data rate of the first data signal.

31. A repeater for regenerating digital subscriber line (DSL) signals communicated across a telecommunication line, comprising:

a DSL receiver coupled to a first telecommunication line segment of the telecommunication line, the DSL receiver configured to receive a first DSL signal from the first telecommunication line segment, the DSL receiver configured to demodulate the first DSL signal to recover digital data by using a constellation that provides a first constellation density; and a DSL transmitter coupled to the DSL receiver and a second telecommunication line segment of the telecommunication line, the second telecommunication line segment bound within a cable, the DSL transmitter configured to form a second DSL signal comprising the digital data by using a constellation that provides a second constellation density, the transmitter further configured to transmit the second DSL signal across the second telecommunication line segment, wherein the second constellation density is higher than the first constellation density, wherein the DSL transmitter is configured to control a spectral shape of the second data signal such that the second DSL signal is spectrally compatible with signals transmitted along a third telecommunication line segment bound within the cable, and wherein the spectral shape of the second data signal is different than a spectral shape of the first data signal and is based on the second constellation.

* * * * *